(12) United States Patent
Orlowski et al.

(10) Patent No.: US 7,052,014 B1
(45) Date of Patent: May 30, 2006

(54) SNAP TOGETHER BEARING ISOLATOR

(76) Inventors: David C. Orlowski, 2901 106th Ave., West, Rock Island, IL (US) 61201; William L. Steinert, 2513 33rd Ave., Rock Island, IL (US) 61201

(*) Notice: Subject to any disclaimer, the term of this patent is extended or adjusted under 35 U.S.C. 154(b) by 0 days.

(21) Appl. No.: 09/244,945

(22) Filed: Feb. 4, 1999

(51) Int. Cl.
   *F16J 15/447* (2006.01)

(52) U.S. Cl. .................. 277/303; 277/419; 277/421; 277/925

(58) Field of Classification Search ............ 277/311, 277/303, 411, 412, 418, 419, 420, 421, 925
See application file for complete search history.

(56) References Cited

U.S. PATENT DOCUMENTS

| | | | | |
|---|---|---|---|---|
| 2,879,093 A | * | 3/1959 | Dolhun | 277/925 X |
| 3,583,710 A | * | 6/1971 | Burelle | 277/615 |
| 4,415,166 A | * | 11/1983 | Beia | 277/551 |
| 4,890,941 A | * | 1/1990 | Calafell et al. | 277/347 |
| 5,069,461 A | * | 12/1991 | Orlowski | |
| 5,378,000 A | * | 1/1995 | Orlowski | |
| 5,957,462 A | * | 9/1999 | Nishiyama et al. | 277/580 |
| 5,967,524 A | * | 10/1999 | Fedorovich | 277/351 |
| 6,062,568 A | * | 5/2000 | Orlowski et al. | 277/348 |
| 6,419,233 B1 | * | 7/2002 | Orlowski | 277/411 |

* cited by examiner

*Primary Examiner*—Alison K. Pickard
(74) *Attorney, Agent, or Firm*—H. Vincent Harsha

(57) ABSTRACT

The assembly includes rotor and stator elements each having an inclined plane or surface juxtaposed to each other. This is a metallic assembly and the rotor and stator also have juxtaposed cavities. The stator cavity being of sufficient size to accommodate a sealing member. The inclined surfaces are flexed with the inclined plane or surface of the rotor forced over the inclined plane or surface of the stator to lock the rotor and stator together with the sealing member enclosed between the rotor and stator. The sealing member does not rotate with the stator. The seal contains at least one labyrinth formed with the rotor and stator, are adjacent each other and lock together.

12 Claims, 1 Drawing Sheet

SNAP TOGETHER BEARING ISOLATOR

BACKGROUND OF THE INVENTION

This invention relates generally to shaft sealing devices protecting bearings for use with rotating equipment. Adequate maintenance of rotating equipment is difficult to obtain because of extreme equipment duty cycles, the lessening of service factors, design and the lack of spare rotating equipment in many processing plants.

Various forms of shaft sealing devices have been utilized to try to protect the integrity of the bearing environment including rubber lip seals, clearance labyrinth seals, and attraction magnetic seals. Lip seals or O-ring shaft seals can quickly wear out and fail and also permit excessive amounts of moisture and other contaminants into the oil reservoir of the operating equipment even before failure.

Labyrinth-type seals involving closely related stator and rotor rings, which do not contact each other but define labyrinth passages between them have been devised and utilized and are illustrated in Orlowski, U.S. Pat. Nos. 4,706,968; 4,989,883; 5,069,461; and the additional patents to Orlowski cited therein. As described in Orlowski U.S. Pat. Nos. 4,989,883 and 5,069,461, improvements in labyrinth seals are disclosed including the utilization of various forms of O-ring seals to improve the static sealing action when the shaft is at rest and non-contact dynamic sealing action when the shaft is rotating.

The seal was improved by the insertion of an O-ring seal inserted into a female cavity. The cavity was in both the rotor and stator and the O-ring was inserted in a novel way by deforming the resilient seal as it was forced into the cavity. Once in position i.e., in the female cavities, the seal returns to its original shape and rotated with the rotor. In addition it secured the rotor and stator together to prevent axial separation of the rotor and stator while static.

SUMMARY OF THE INVENTION

An objective of the present invention is to provide a seal around rotating shafts and between the housing and the shaft to prevent leakage of lubricant and the entry of contaminants by the use of an annular ring seal contained within a cavity formed in the stator and rotor.

The prior art seals, prior to Orlowski, U.S. Pat. No. 5,378,000 utilized O-ring members having contact with both the stator and the rotor when the shaft is at rest but which disengaged from the stator when the shaft rotates at normal operating speed.

Prior art mechanisms, utilizing labyrinth and seals, have normally provided a female recess in the rotor and a male surface or projection on the stator. The improvement in the sealing device by having the seal in a recess or female surface on both the rotor and the stator was shown in Orlowski U.S. Pat. No. 5,378,00.

The novel bearing isolator of this invention includes the feature of being able to snap the rotor and the stator together with nothing holding the rotor and stator together in the axial direction except contact between the rotor and stator faces.

Also the O-ring seal is inserted into the cavities in the rotor and stator in such a manner that the seal is stationary in the cavity both when rotation of the shaft is present and when the shaft is at rest. The point contact of the shapes or ramps of the rotor and stator prevents axial separation of the rotor and stator even when axial adjustments on certain centrifugal process pumps are made or other axial movements or alignments of the shafts are required or made.

To accomplish this, the bearing isolator mechanism comprises a stator ring or member affixed to the housing and a rotor ring or member attached to the shaft as is normal in such seals. The stator and rotor each have female recesses or cavities which oppose each other when assembled and an annular seal member is mounted in said recesses or cavities. The rotor and stator are assembled together or snapped together by two corresponding slopes or inclined planes, one on the rotor and the other on the stator.

The simultaneous flexing of the ramp surfaces of the rotor and stator permits the locking function when the seal members are pressed together.

The internal diameter of the ramp of the rotor is slightly less than the outside diameter of the ramp adjacent of the stator. Thus affecting a locking mechanism when the seal i.e., the stator and rotor is pressed or snapped together. Thus there are no additional complexities in the seal including lips, grooves and flanges which have been utilized in connection with plastic seals to affect an interference fit and axial lock due to the shape and relationship of the lips and flanges.

This invention provides also a novel means of inserting and retaining the sealing ring into recesses or cavities in the stator and rotor whereby once assembled, the stator and rotor are axially locked together.

Other objects, advantages, and embodiments of the invention will become apparent upon reading the following detailed description and upon reference to the drawings and to the prior art patents.

DETAILED DESCRIPTION OF THE PREFERRED EMBODIMENT OF THE INVENTION

Figure 1:
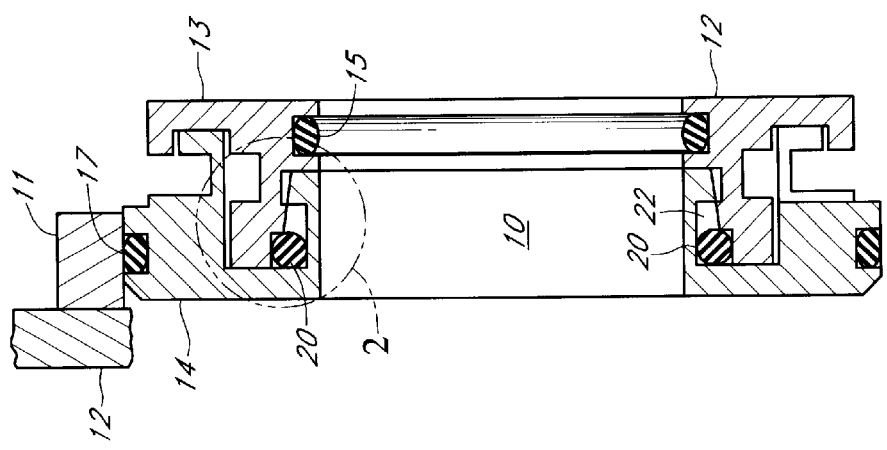
FIG. 1 is a sectional view showing the improved sealing structure with a shaft.

Referring first to FIG. 1. There is shown the bearing isolator including a novel locking mechanism and seal mounted on shaft 10. The shaft 10 protrudes through the isolator 18 and the housing 11 and the bearing 12. The novel isolator of this invention is shown with the stator 14 and the seal 17 holding the bearing isolator or seal 18 in position. The rotor ring 13 is affixed to the shaft by means of the frictional seal 15. The rotor ring follows the rotational movement of the shaft 10 because of the frictional engagement of the seal 15. The labyrinths and passages are substantially as shown in FIG. 1 but will not be described in detail herein because such description is readily available and found in the referenced patents. Such description is specifically found in U.S. patent application Ser. No. 09/139,499.

Figure 2:
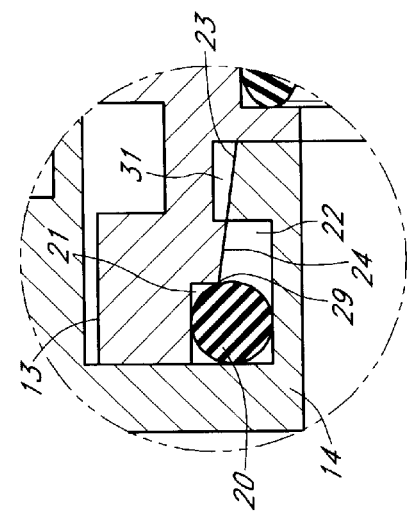
FIG. 2 is a sectional view showing in detail the assembly of the sealing ring into the cavities of the rotor and stator.

The novelty of this invention is shown in FIG. 1 but is best described by reference to FIGS. 1 and 2 together. As shown, there is a female or recess or cavity portion in both the stator 14 and rotor 13. As shown in FIG. 2, the rotor 13 has a cavity 21 cut adjacent the stator 14, and cavity 31. The rotor has a female portion a 21 which has its sides parallel to or at right angles to the shaft 10. This rotor 13 has a slope or inclined portion 24, which is inclined from the cavity 21 toward the shaft 10. The stator 14 has a cavity portion 22, which has its sides parallel to or at right angles to the shaft. The cavity 22 extends the stator 14 to include the slope portion 24 of the rotor. The stator also includes a ramped, inclined plane or sloped portion 23 which is sloped in the same direction as the surface 24 i.e., toward the shaft and away from the cavity. As shown in FIG. 2 the internal diameter of the rotor at the extremity of slope 24 is slightly less than the outside diameter of the stator 14 at the cavity end of the slope 23.

The O-ring 20 is of the dimension slightly less than the dimension cavity 21. This permits the O-ring to lightly contact the rotor at a point where the rotor protrudes into the cavity 22 and thus permits it to respond to differences in pressure introduced in the seal. These differential pressures may be introduced as external contaminant pressure or by a reduced pressure or vacuum in the volume of the sealed housing 11 into which the seal 13 is inserted.

The seal or O-ring 20 in this invention is stationary and does not rotate with the rotor as described in U.S. Pat. No. 5,378,000. A small amount of grease will be placed into the cavity 22 to ensure the smooth running and improved sealing action of the seal. It also prevents deterioration of the seal ring 20 in the event there is contact between the O-ring 20 and the rotor 13.

In order to obtain this locking action between the rotor and stator at the junction of the two slopes 23 and 24, a certain assembly procedure must be followed. Cavities are formed in the rotor 13 and stator 14 in a normal manufacturing procedure. The seal or O-ring 20 is then placed in the cavity 22 along with a certain amount of grease. Ramp surfaces 23 and 24 of the rotor 13 and the stator 14 are then pressed together so that the rotor ramp 23 rides up over the stator ramp 24. The simultaneous flexing of the ramped surfaced 23 and 24 must be within the elastic limits of the material. The material of the rotor 13 and stator 14 would normally be bronze but could be any metal or plastic. It is imperative that any permanent deformation of the rotor and stator is avoided. As noted before, the internal diameter of the rotor ramp 24 is slightly less than the outside diameter of the ramp 23 of the stator 14 thus affecting an axial locking mechanism at the point where the two ends are adjacent each other.

As shown in FIG. 2 the O-ring or seal 20 is in slight contact with the rotor 13 and stator 14, but does not rotate with the rotor 13.

The O-ring 20 is typically made of Viton, nitrile, Aflas or any other suitable elastomer. These fluoro elastomer materials are currently available. Viton is manufactured by DuPont.

Variations and other aspects of the preferred embodiment will occur to those versed in the all without departure from the spirit and scope of the invention.

What is claimed:

1. A bearing isolator for sealing a rotating shaft exiting a housing comprising:
   a) a housing;
   b) a shaft extending through said housing, an annular stator member, said stator member including means for affixing said stator to said housing;
   c) said stator member having a radial cavity in a surface face parallel to said shaft;
   d) an annular rotor member, said rotor member rotatively connected to said shaft, having first and second radial rectangular cavities in the surface face parallel to said shaft;
   e) said radial cavity in said stator of different axial and radial dimensions than the radial cavities in said rotor;
   f) resilient annular elastomeric sealing member;
   g) the width of said first rotor radial cavity shall be slightly more than the diametric cross section of said elastomeric sealing member;
   h) the surface faces parallel to said shaft overlapping with at least a portion of said first and said stator cavity aligned and juxtaposed to form a fourth cavity;
   i) said resilient annular sealing member substantially inertly occupying said fourth cavity to seal the housing interior from the environment external said housing.

2. A bearing isolator, according to claim 1, where said sealing member has a circular cross section.

3. A bearing isolator, according to claim 1, wherein said sealing member is formed of an elastomeric material.

4. A bearing isolator, according to claim 1, wherein said radial cavities are rectangular in shape and have surface faces parallel, perpendicular, and at an angle to said shaft.

5. A bearing isolator, according to claim 4, wherein the width of the stator cavity shall be greater that the cross sectional diameter of the elastomeric sealing member.

6. A bearing isolator, according to claim 4, wherein the depth of the first rotor cavity shall be less than the outside diameter of the elastomeric sealing member.

7. A bearing isolator, in accordance with claim 4, wherein said cavity in said stator shall have a depth slightly less than one-half the diameter of the elastomeric sealing material.

8. A method of sealing a shaft bearing, the shaft rotatively extending from a housing, the method comprising:
   a) a rotor and a stator;
   b) mounting the rotor sealed on the shaft in close relation to the housing and in rotation with the shaft;
   c) the stator and rotor having overlapping radially spaced cylindrical surfaces;
   d) a cavity in the cylindrical surface of said rotor and a cavity in the cylindrical surface of said stator;
   e) said cavities designed to be aligned and juxtaposed to form a new cavity when said stator and said rotor are properly positioned with respect to each other on said shaft;
   f) placing a solid resilient annular elastomeric seal member into the cavity in said stator;
   g) said stator and said rotor each having a sloping surface;
   h) forcing said slopping surface of said rotor along the slopping surface of said stator until said surfaces do not touch, whereby said elastomeric seal member is constrained in said new cavity formed between the rotor and stator cavities.

9. The method of claim 8 wherein said solid resilient annular elastomeric seal member has a diameter less than the diameter of the new cavity.

10. A bearing isolator for sealing a rotating shaft exiting a housing comprising:
   a) a housing;
   b) a shaft extending through said housing;
   c) an annular stator member, said stator member including means for affixing said stator to said housing;
   d) said stator having a radial cavity therein on a surface face parallel to said shaft;
   e) a circular elastomeric sealing member;
   f) an annular rotor member including first and second cavities;
   g) said stator radial cavity having a width greater than diameter of the sealing member and the depth of said stator radial cavity greater than the diameter of said sealing member;

h) one of the cavities in said rotor and the cavity in said stator aligned and juxtaposed to form a fourth cavity;

i) said elastomeric circular sealing member therefore substantially inertly occupying substantial portions of said fourth cavity to seal the housing interior from the environment external said housing;

j) said stator member has a ramp surface extending from the vertical wall of its cavity in the axial and radial directions toward said rotor, and said rotor has a ramp extending between said first and second cavities in the axial and radial directions towards said rotor, whereby when the inclined ramp of said rotor is forced over the inclined ramp surface of said stator the said stator and said rotor are axially joined.

11. A bearing isolator according to claim 10, wherein said ramp surface of said stator has a greater radial dimension than the least radial dimension of the ramp surface of said rotor.

12. A bearing isolator according to claim 10, wherein point contact is established between the ramp surfaces of said rotor and said stator whereby said circular sealing member is loosely held in acclivity created by said rotor and stator and said rotor and said stator are secured to each other.

* * * * *